United States Patent [19]
Nakamura

[11] Patent Number: 5,127,246
[45] Date of Patent: Jul. 7, 1992

[54] METHOD OF AND APPARATUS FOR STRENGTHENING GEAR TOOTH

[75] Inventor: Shigetoshi Nakamura, Kanagawa, Japan

[73] Assignee: Nissan Motor Co., Ltd., Yokohama, Japan

[21] Appl. No.: 655,647

[22] Filed: Feb. 14, 1991

[30] Foreign Application Priority Data

Feb. 16, 1990 [JP] Japan .................................. 2-35952
Feb. 16, 1990 [JP] Japan .................................. 2-35953

[51] Int. Cl.$^5$ .............................................. B21H 5/00
[52] U.S. Cl. ........................................ 72/108; 72/84
[58] Field of Search ............... 148/147; 29/893, 893.3, 29/893.32, 893.34; 72/84, 102, 107, 108

[56] References Cited

U.S. PATENT DOCUMENTS

| | | | |
|---|---|---|---|
| 1,558,086 | 10/1925 | Gustavsen | 29/893.32 |
| 1,642,179 | 9/1927 | Schurr | 72/107 |
| 3,292,405 | 12/1966 | Tremblay | 72/216 |
| 3,563,076 | 2/1971 | Daniel | 72/108 |
| 4,798,077 | 1/1989 | Douglas | 29/893.34 |

FOREIGN PATENT DOCUMENTS

| | | | |
|---|---|---|---|
| 0044522 | 7/1981 | European Pat. Off. | |
| 1134567 | 8/1962 | Fed. Rep. of Germany | 29/893.3 |
| 1288877 | 4/1969 | Fed. Rep. of Germany | 29/893.32 |
| 2396088 | 3/1979 | France | 148/147 |
| 17699 | 7/1979 | Japan | 148/147 |
| 173047 | 10/1983 | Japan | 29/893.32 |
| 59-39438 | 3/1984 | Japan . | |
| 836148 | 6/1981 | U.S.S.R. . | |
| 844115 | 7/1981 | U.S.S.R. . | |
| 941009 | 7/1982 | U.S.S.R. | 29/893.3 |
| 2050908A | 1/1981 | United Kingdom . | |

*Primary Examiner*—Lowell A. Larson
*Attorney, Agent, or Firm*—Foley & Lardner

[57] ABSTRACT

For strengthening teeth of a toothed wheel, the bottom lands of the toothed wheel are pushed by a stamping tool against a backup gear for thereby causing residual compressive stress at locations extending from the bottom lands to roots of the teeth. The stamping tool has stamping projections which are angled at the tips thereof to have tapering ends and brought into contact at the tapering ends with the bottom lands of the toothed wheel. The stamping tool is axially movable relative to the work such that the tapering ends are brought into contact with the bottom lands of the toothed wheel at locations which are different axially of the toothed wheel.

4 Claims, 4 Drawing Sheets

METHOD OF AND APPARATUS FOR STRENGTHENING GEAR TOOTH

BACKGROUND OF THE INVENTION

1. Field of the Invention

The present invention relates to a method of and apparatus for increasing the strength of a gear tooth, particularly the fatigue strength at the root or root fillet thereof.

2. Description of the Prior Art

With a view to increasing the strength of a gear tooth, particularly the fatigue strength at the root or root fillet at which the gear tooth is most likely to be broken due to fatigue, shot peening has heretofore been used for processing the gear tooth after heat treatment.

Shot peening is a process for casting or blowing metal particles upon the gear tooth to harden the surface thereof while causing residual compressive stress in the surface layer, and is widely used for increasing the fatigue strength or tensile strength of mechanical parts or elements such as a toothed wheel, spring, shaft, etc.

Shot peening however has the disadvantage that the area to be shot peened is limited due to the restrictions of the shot peening device, such as the restriction on nozzle bore size. For this reason, the metal particles are liable to be cast or blown upon portions other than the tooth bottom and root fillet of the gear tooth such as the tooth face and tooth flank, causing the problem that the tooth face and tooth flank become rough or have undesirable protrusions or recessions.

SUMMARY OF THE INVENTION

In accordance with the present invention, there is provided a method of strengthening a gear tooth of a part having a bottom land adjacent to a root of the gear tooth. The method comprises the steps of supporting the part with a backup and pushing the bottom land of the part toward the backup with a stamping tool, thereby causing residual compressive stress at a location extending from the bottom land to the root.

In accordance with the present invention, there is further provided an apparatus for strengthening a gear tooth of a part having a bottom land adjacent to a root of the gear tooth. The apparatus comprises a backup for supporting the part, and a stamping tool for pushing the bottom land of the part against the backup.

The above method and apparatus are effective for solving the above noted problem inherent in the prior art process.

It is accordingly an object of the present invention to provide a novel method of strenthening a gear tooth, which can efficiently increase the strength of the gear tooth without deteriorating the surface quality of the gear tooth, particularly at the tooth face and tooth flank thereof.

It is a further object of the present invention to provide a novel method, of the above described character, which can efficiently increase the fatigue strenth or tensile strength of the gear tooth, particularly at the root or root fillet thereof.

It is a further object of the present invention to proivde an apparatus for carrying out the method of the above described character.

BREIF DESCRIPTION OF THE DRAWINGS

DESCRIPTION OF THE PREFERRED EMBODIMENTS

Figure 1:
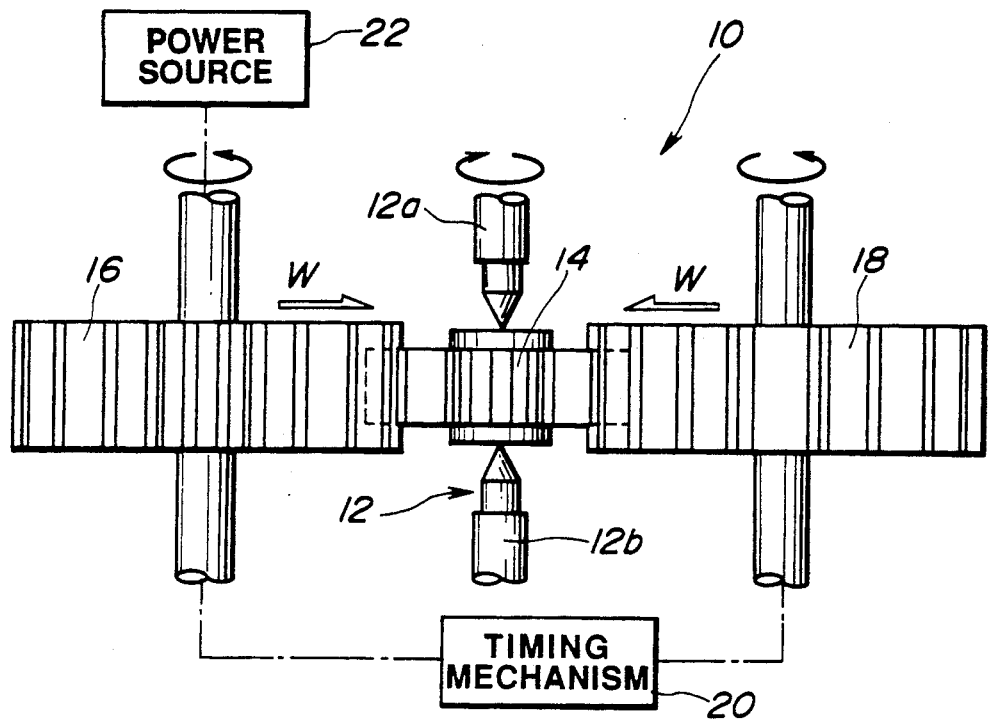
FIG. 1 is a schematic side elevational view of an apparatus for strengthening a gear tooth according to an embodiment of the present invention.
Figure 2:
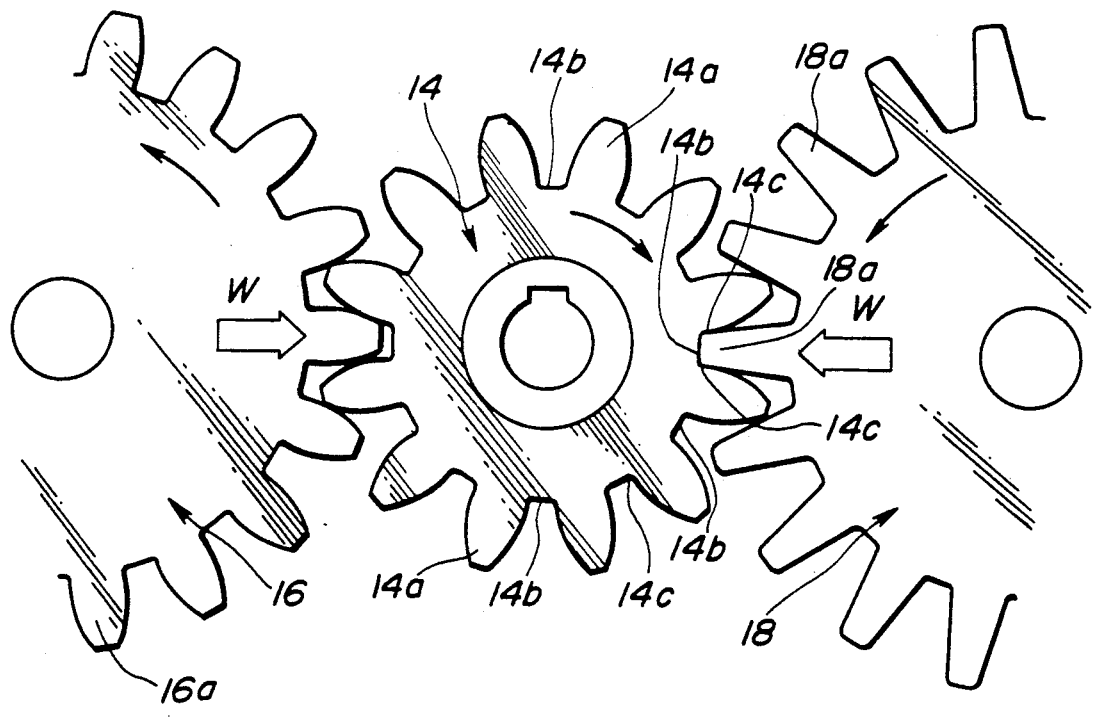
FIG. 2 is an enlarged top plan view of the apparatus of FIG. 1.

Referring first to FIGS. 1 and 2, an apparatus for strengthening a gear tooth according to an embodiment of the present invention is generally indicated by 10 and includes a work holder 12 for releasably and rotatably holding a work 14 in the form of a toothed wheel having a plurality of gear teeth 14a, a backup gear 16 meshed with the work 14 for sustaining a radial road applied thereto, and a stamping tool or rotary die 18 in the form of a toothed wheel, meshed with the work 14 and having a plurality of radial stamping projections 18a sequentially brought into contact with bottom lands 14b of the work 14 for pushing it toward the backup gear 16. To this end, the stamping projections 18a are formed so as to be of the same pitch as the teeth 14a of the work 14.

More specifically, the work holer 12 includes a pair of spildles 12a and 12b which are axially aligned and movable toward and way from each other. The backup gear 16 has the same tooth shape and module as the work 14 though larger in the number of teeth than the work 14.

In order that the backup gear 16 can serve as an efficient backup, the work 14, the guide gear 16 and the rotary die 18 are disposed so that the center axes thereof are contained in a common plane. Further, the center axes of the work 14, the guide gear 16 and the rotary die 18 are arranged so as to be parallel to each other.

The backup gear 16 and the rotary die 18 are drivingly connected through a timing mechanism 20 such as a timing chain or belt so as to rotate in a timed relation to each other. The backup gear 16 is drivingly connected to a power source 22 such as an electric motor so as to be driven thereby.

In operation, the work 14 having finished heat treatment is prepared and set as shown. The power source 22 is then energized to drive the backup gear 16. By doing this, the work 14 is driven in a predetermined direction (e.g. the clockwise direction as indicated by the arrow in FIG. 2) by means of the backup gear 16 and the rotary die 18. In this instance, the rotary die 18 is sized and shaped so as to push the work 14 with a predetermined force "W", i.e., the rotary die 18 is adapted so that the stamping projections 18a of the rotary die 18 are sequentially brought into contact with the bottom lands 14b of the work 14 to push the same with a predetermined force "W" which is set depending on the material, size, etc. of the work 14. The radial force or load "W" is transmitted to the backup gear 16, and therefore a reaction force "W" is applied from the backup gear 16 to the work 14. Thus, residual compressive stress is caused in each gear tooth 14a of the work 14 at a location extending from the bottom land 14b to the root or root fillet 14c, thus making it possible to increase the fatigue strength or tensile strength of each gear tooth 14a at the root or root fillet thereof.

In the foregoing, it is to be noted that each stamping projection 18a does not contact the tooth flank and the tooth face but contacts the bottom land 14a and the root fillet 14c only, thus making it possible to assuredly prevent the tooth flank and tooth face of each gear tooth 14a from becoming rough after the process for increasing the fatigue strength.

Figure 3:
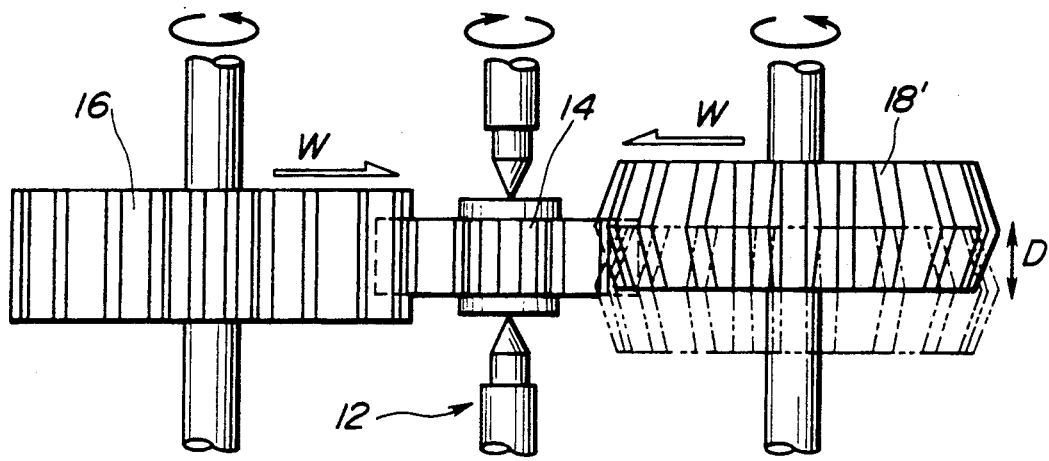
FIG. 3 is a view similar to FIG. 1 but shows a modification of the present invention.
Figure 4:
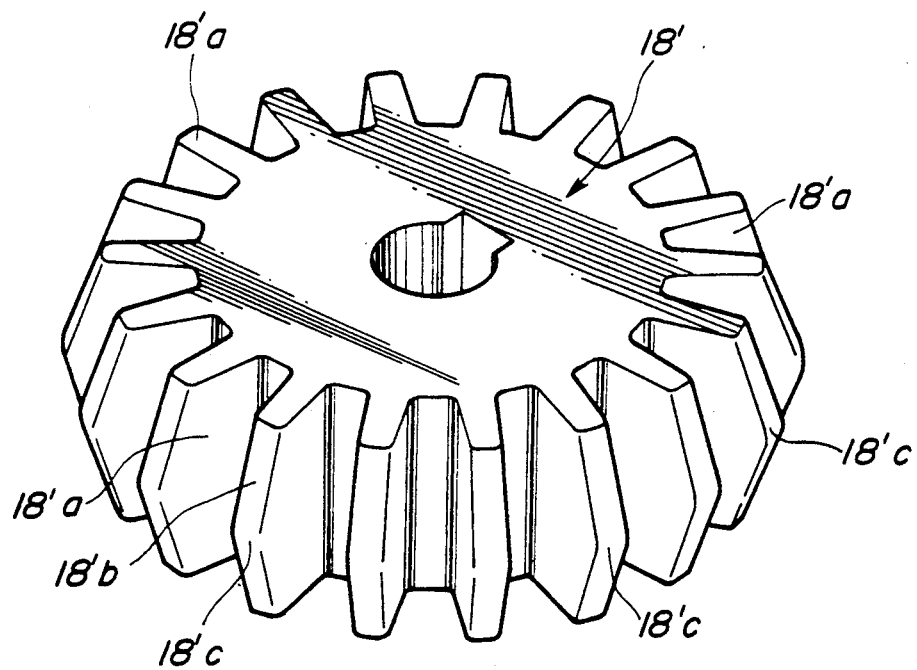
FIG. 4 is an enlarged perspective view of a stamping tool employed in the apparatus of FIG. 3.

FIG. 3 shows an embodiment which is substantially similar to the previous embodiment of FIGS. 1 and 2 except that a rotary die 18' of FIG. 4 is employed. The rotary die 18' differs from that of the previous embodiment in that the stamping projections 18'a have top lands 18'b which are angled axially of the die 18' to have narrow or tapering ends 18'c arranged in a circular array and axially and centrally of the die 18'. The tapering ends 18'c are rounded throughout its length.

The rotary die 18' is movable axially thereof a distance "D" corresponding to the width of the work 14 such that the tapering ends 18'c are brought into contact with the bottom lands 14b of the work 14 at locations which are different axially of the work 14. That is, by the movement of the rotary die 18' over the distance "D" relative to work 14, each bottom land 14b can be pushed in its entirety by the tapering ends 18'c.

This rotary die 18' makes it possible to contact and push the bottom lands 14b of the work 14 more assuredly. That is, the bottom lands 14b of the work 14 are liable to be formed with protrusions and recessions (i.e., undulations) during machining such as hobbing. In such a case, the rotary die 18 of the previous embodiment of FIGS. 1 and 2 can contact only the protruding portions of the bottom lands 14b and therefore cannot cause a uniform residual compressive stress in the work 14.

With the rotary die 18', the tapering ends 18'c can be brought into contact not only with the protruding portions but the receding portions of the bottom lands 14b of the work 14 and therefore can cause a uniform residual compressive stress in the work 14 even when the bottom lands 14b of the work 14 have protrusions and recessions.

Except for the above, this embodiment can produce substantially the same effect as the previous embodiment of FIGS. 1 and 2.

Figure 5:
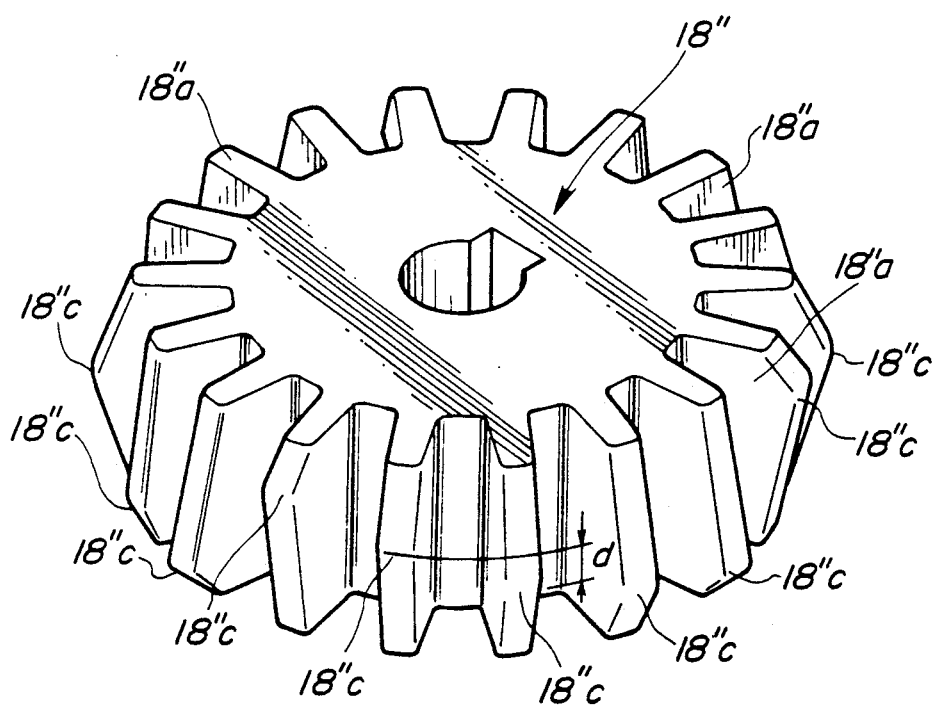
FIG. 5 is a view similar to FIG. 4 but shows a variant of the stamping tool.

FIG. 5 shows a rotary die 18" according to a further variant of the present invention. The rotary die 18" differs from that 18' of the previous embodiment of FIGS. 3 and 4 in that the tapering ends 18"c are spaced apart from each other in the axial direction of the die 18", i.e., the tapering ends 18"c of the adjacent two stamping projections 18"a are spaced a predetermined distance "d" in the axial direction of the die 18".

With this rotary die 18" the relative movement of the die 18" and the work 14 can be reduced i.e. can be reduced to the distance "d" between the tapering ends 18"c of the adjacent two stamping projections 18"a.

Except for the above, this rotary die 18" can produce substantailly the same effect as that 18' of the previous enbodiment of FIGS. 3 and 4.

Figure 6:
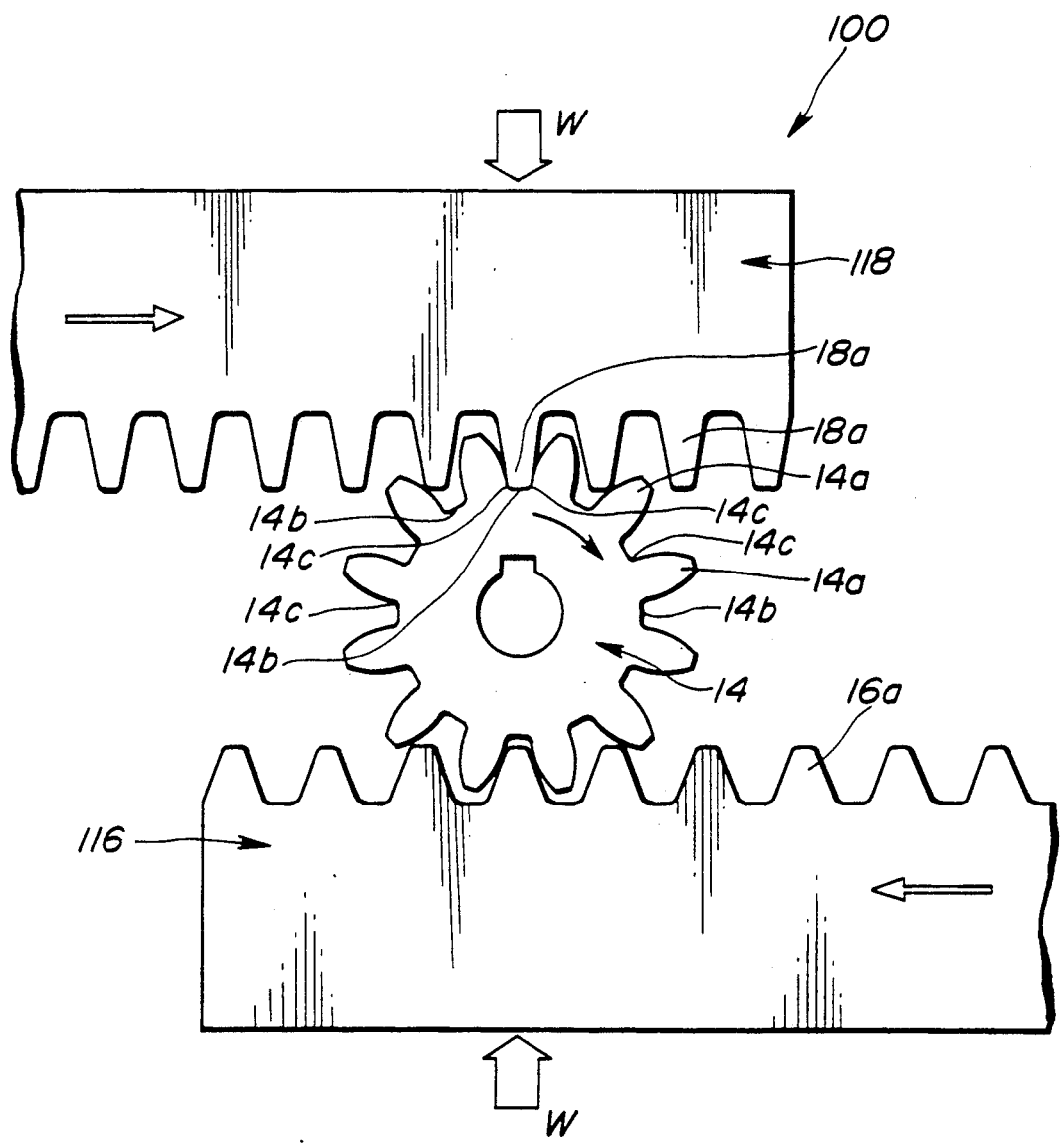
FIG. 6 is a schematic side elevational view of an apparatus for strengthening a gear tooth according to a further modification of the present invention.

Referring to FIG. 6, an apparatus for strengthening a gear tooth according to a further embodiment is generally indicated by 100 and includes a backup rack 116 and a stamping rack 118 interposing therebetween the work 14. The backup rack 116 is formed with the same teeth 16a as the backup gear 16 of the previous embodiment of FIGS. 1 and 2 though the teeth 16a of the backup rack 116 are not arranged in a circular array but in a straight line. Similarly, the stamping rack 118 is formed with the same stamping projections 18a as the rotary die 18 of the previous embodiment of FIGS. 1 and 2 though the stamping projections 18a of the stamping rack 118 are not arranged in a circular array but in a straight line.

In operation, the racks 116 and 118 are moved relative to each other while being pushed against each other with a predetermined force "W".

Except for the above, this embodiment is substantially similar to the previous embodiment of FIGS. 1 and 2 and can produce substantialy the same effect.

What is claimed is:

1. An apparatus for strengthening teeth of a toothed wheel having bottom lands, comprising:
   a work holder for rotatably supporting the toothed wheel;
   a backup gear, disposed on one side of said work holder in meshing engagement with the toothed wheel;
   a rotary die disposed on the other side of said work holder having a plurality of stamping projections sequentially brought into contact with said bottom lands of the toothed wheel such that the bottom lands are pushed toward the backup gear thereby causing residual compressive stress at locations extending from the bottom lands to adjacent roots of said teeth;
   wherein said stamping projections have top lands angled axially of said rotary die, said top lands having tapering ends which are brought into contact with the bottom lands of the toothed wheel, said tapering ends being arranged, with respect to the axial direction of said rotary die, in different positions from each other.

2. The apparatus according to claim 1, further comprising a timing mechanism through which said backup gear and said rotary die are drivingly connected so as to rotate in a timed relation to each other.

3. The appratus according to claim 2, further comprising a power source for driving said backup gear.

4. The apparatus according to claim 1, wherein said tapering ends include a tapering end which is located adjacent to one axial end of said rotary die and a tapering end which is located adjacent to the other axial end of said rotary die.

* * * * *